US012383830B2

(12) United States Patent
Zhou

(10) Patent No.: US 12,383,830 B2
(45) Date of Patent: Aug. 12, 2025

(54) METHOD AND APPARATUS FOR USING VIRTUAL THROWING PROP, TERMINAL, AND STORAGE MEDIUM

(71) Applicant: TENCENT TECHNOLOGY (SHENZHEN) COMPANY LIMITED, Shenzhen (CN)

(72) Inventor: Minke Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 426 days.

(21) Appl. No.: 17/952,259

(22) Filed: Sep. 25, 2022

(65) Prior Publication Data

US 2023/0013014 A1 Jan. 19, 2023

Related U.S. Application Data

(63) Continuation of application No. PCT/CN2021/122675, filed on Oct. 8, 2021.

(30) Foreign Application Priority Data

Oct. 23, 2020 (CN) ........................ 202011148701.1

(51) Int. Cl.
*A63F 13/533* (2014.01)
*A63F 13/52* (2014.01)
*A63F 13/837* (2014.01)

(52) U.S. Cl.
CPC ............ *A63F 13/533* (2014.09); *A63F 13/52* (2014.09); *A63F 13/837* (2014.09); *A63F 2300/308* (2013.01); *A63F 2300/8076* (2013.01)

(58) Field of Classification Search
CPC ...... A63F 13/533; A63F 13/52; A63F 13/837; A63F 2300/308; A63F 2300/8076
See application file for complete search history.

(56) References Cited

U.S. PATENT DOCUMENTS

| | | | | |
|---|---|---|---|---|
| 6,183,363 | B1 | 2/2001 | Ishihara et al. | |
| 2021/0101074 | A1* | 4/2021 | Hemby | A63F 13/2145 |
| 2022/0226727 | A1 | 7/2022 | Yao | |

FOREIGN PATENT DOCUMENTS

| | | | |
|---|---|---|---|
| CN | 110538459 | A | 12/2019 |
| CN | 111389005 | A | 7/2020 |
| CN | 111589124 | A | 8/2020 |
| CN | 111589149 | A | 8/2020 |

(Continued)

OTHER PUBLICATIONS

Fallout: new Vegas wiki, C4 plastic explosives, game released 2010 (Year: 2010).*

(Continued)

*Primary Examiner* — Thomas H Henry
(74) *Attorney, Agent, or Firm* — ANOVA LAW GROUP PLLC

(57) ABSTRACT

Embodiments of this application disclose a method and apparatus for using a virtual throwing prop. The method includes displaying a prop throwing control; controlling a virtual object to throw a virtual throwing prop and displaying a prop triggering control in response to a trigger operation on a prop throwing control; and triggering a prop effect of the virtual throwing prop in response to a trigger operation on the prop triggering control.

19 Claims, 10 Drawing Sheets

303
303
302
304
304
302
306
305
307
307

(56) References Cited

FOREIGN PATENT DOCUMENTS

| | | | |
|---|---|---|---|
| CN | 111659119 | A | 9/2020 |
| CN | 111744186 | A | 10/2020 |
| CN | 111760284 | A | 10/2020 |
| CN | 112138384 | A | 12/2020 |
| JP | 2000084245 | A | 3/2000 |

OTHER PUBLICATIONS

PabstMirror, ACE3, 2019 (Year: 2019).*
China National Intellectual Property Administration (CNIPA) Office Action 1 for 202011148701.Nov. 31, 2021 18 Pages (including translation).
The World Intellectual Property Organization (WIPO) International Search Report for PCT/CN2021/122675 Jan. 11, 2022 6 Pages (including translation).
"The wonderful playback has been optimized again, and the OB system minimap has added props to explain" , Jan. 15, 2020.
"How to detonate c4 in call of duty ol", Jul. 23, 2014.

* cited by examiner

METHOD AND APPARATUS FOR USING VIRTUAL THROWING PROP, TERMINAL, AND STORAGE MEDIUM

RELATED APPLICATIONS

This application is a continuation of PCT Application No. PCT/CN2021/122675, field on Oct. 8, 2021, which claims priority to Chinese Patent Application No. 202011148701.1, entitled "METHOD AND APPARATUS FOR USING VIRTUAL THROWING PROP, TERMINAL, AND STORAGE MEDIUM", and filed on Oct. 23, 2020. The two applications are both incorporated herein by reference in their entirety.

FIELD OF THE TECHNOLOGY

Embodiments of this application relate to the field of human-computer interaction, and in particular, to a method and apparatus for using a virtual throwing prop, a terminal, and a storage medium.

BACKGROUND OF THE DISCLOSURE

The battle game is a game in which a plurality of user accounts compete in the same game scene. The player may operate a virtual object in a virtual environment to perform actions such as walking, running, climbing, or shooting, and a plurality of players may team up online to complete a task in the same virtual environment.

SUMMARY

Embodiments of this application provide a method and apparatus for using a virtual throwing prop, a terminal, and a storage medium, to improve a hit rate of the virtual throwing prop by changing a triggering method of the virtual throwing prop, thereby further improving utilization of the virtual throwing prop during battling. The technical solutions are as follows:

According to an aspect, an embodiment of this application provides a method for using a virtual throwing prop, applied to a terminal, the method including: displaying a prop throwing control; controlling a virtual object to throw a virtual throwing prop and displaying a prop triggering control in response to a trigger operation on a prop throwing control; and triggering a prop effect of the virtual throwing prop in response to a trigger operation on the prop triggering control.

According to another aspect, an embodiment of this application provides a terminal, including a processor and a memory, the memory storing at least one piece of instruction, at least one program, a code set, or an instruction set, the at least one piece of instruction, the at least one program, the code set, or the instruction set being loaded and executed by the processor to implement: displaying a prop throwing control; controlling a virtual object to throw a virtual throwing prop and displaying a prop triggering control in response to a trigger operation on a prop throwing control; and triggering a prop effect of the virtual throwing prop in response to a trigger operation on the prop triggering control.

According to another aspect, an embodiment of this application provides a non-transitory computer-readable storage medium, storing at least one piece of instruction, at least one program, a code set, or an instruction set, the at least one piece of instruction, the at least one program, the code set, or the instruction set being loaded and executed by a processor to implement the method for using a virtual throwing prop described in the foregoing aspect.

According to another aspect, an embodiment of this application provides a computer program product or computer program, including a computer instruction stored in a computer-readable storage medium. A processor of a terminal reads the computer instructions from the computer-readable storage medium, and executes the computer instructions, to cause the terminal to perform the method for using a virtual throwing prop provided in the example implementations of the foregoing aspect.

In the embodiments of this application, after controlling a virtual object to throw a virtual throwing prop, the terminal switches a prop switching control (configured to switch a virtual prop) to a prop triggering control, and performs a trigger operation on the prop triggering control, to trigger a prop effect of the virtual throwing prop. Therefore, the triggering method of the virtual throwing prop is changed, on the one hand, a player can autonomously control to trigger the virtual throwing prop, so that the virtual throwing prop may be triggered at an appropriate time, and the hit rate of the virtual throwing prop during battling may be improved, thereby improving the utilization of the virtual throwing prop; and on the other hand, the trigger control controls release of a prop effect of a thrown prop, so that two processes of throwing a prop and releasing a prop effect are separated, thereby providing a novel human-computer interaction method, and improving richness of human-computer interaction.

DESCRIPTION OF EMBODIMENTS

Figure 1:
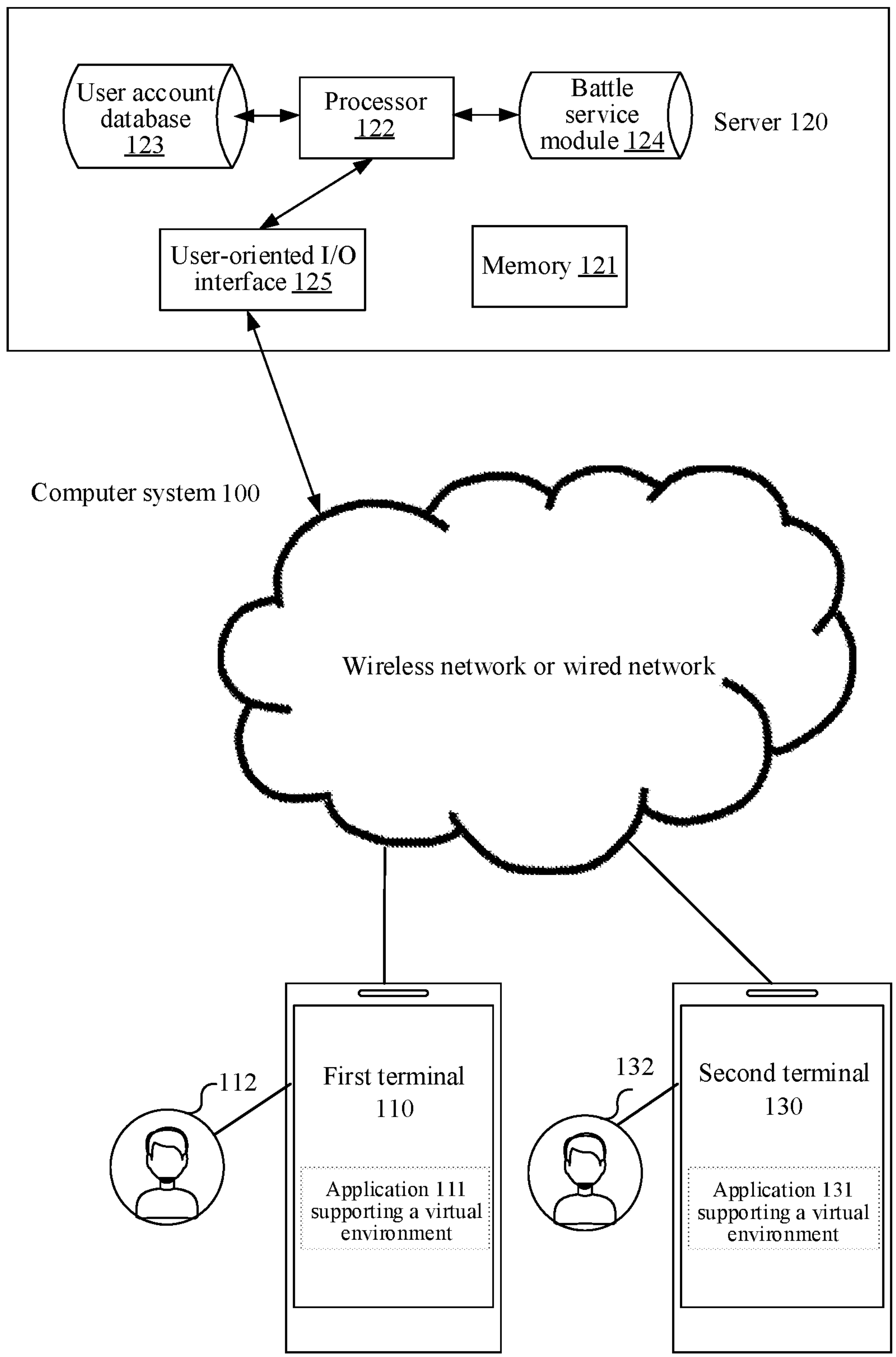
FIG. 1 is a schematic diagram of an implementation environment according to an embodiment of this application.

First, terms involved in the embodiments of this application are introduced:

Virtual environment: It is a virtual environment displayed (or provided) by an application program when running on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional virtual environment. This is not limited in this application. In the following embodiments, description is made by using an example in which the virtual environment is a three-dimensional virtual environment.

Virtual object: It refers to a movable object in the virtual environment. The movable object may be a virtual person, a virtual animal, a cartoon person, or the like, such as a person or an animal displayed in a three-dimensional virtual environment. In some embodiments, the virtual object is a three-dimensional model created based on a skeletal animation technology. Each virtual object has a respective shape and size in the three-dimensional virtual environment, and occupies space in the three-dimensional virtual environment.

Shooting game: It includes a first-person shooting game and a third-person shooting game. The first-person shooting game is a shooting game in which a user can play in a first-person perspective. A virtual environment picture in the game is a picture of a virtual environment observed with a perspective of a first virtual object. The third-person shooting game is a shooting game played in a third-person perspective. A virtual environment picture in the game is a picture of a virtual environment observed with the third-person perspective (for example, in rear of a head of the first virtual object).

In the game, at least two virtual objects play in a single-round battle mode in the virtual environment. The virtual object eludes damage from other virtual objects and dangers (for example, a poison gas area and a swamp) in the virtual environment to survive in the virtual environment. When a health point of the virtual object in the virtual environment is zero, the life of the virtual object in the virtual environment ends, and the final virtual object surviving in the virtual environment wins. In some embodiments, the battle starts with a moment when the first client joins the battle, and ends with a moment when the last client exits the battle. Each client may control one or more virtual objects in the virtual environment. In some embodiments, arena modes of the battle may include a single-player battle mode, a two-player team battle mode, or a multi-player team battle mode. The battle mode is not limited in the embodiments of this application.

Virtual prop: It is a prop that a virtual object can use in a virtual environment, including a virtual weapon that can change an attribute value of another virtual object, a supply prop such as bullets, a defensive prop such as a shield, an armor, or an armored vehicle, a virtual prop such as a virtual beam or a virtual shock wave shown through a hand when being used for casting a skill by the virtual object, and a body part of the virtual object, such as a hand or a leg. The virtual prop that can change the attribute value of another virtual object includes a long-distance virtual prop such as a pistol, a rifle, a sniper rifle, a short-distance virtual prop such as a dagger, a knife, a sword, or a rope, or a throwing virtual prop such as a throwing axe, a throwing knife, a grenade, a flash bomb, or a smoke grenade.

The method provided in this application may be applied to a virtual reality application, a three-dimensional map program, a military simulation program, a first-person/third-person shooting game, a multiplayer online battle arena game (MOBA), and the like. An application during a game is used as an example for description in the following embodiments.

A game based on the virtual environment usually includes maps of one or more game worlds. The virtual environment in the game simulates scenes in the real world. The user may control a virtual object in the game to perform actions in the virtual environment such as walking, running, jumping, shooting, combating, driving, switching to a virtual prop, and using the virtual prop to damage another virtual object, which has relatively high interactivity. In addition, a plurality of users may form a team online to perform an arena game.

During a game battle, a player may control a virtual object to throw a virtual throwing prop for attacking, for example, throwing a grenade may reduce hit points of another virtual object, and throwing a smoke grenade, a flash bomb, and the like may interfere with another virtual object. However, in the related art, after the player controls the virtual object to throw the virtual throwing prop, the virtual throwing prop may release a prop effect only when a throwing time reaches a threshold or meets a specific condition. In this case, the player can only passively wait, and the best timing to release the prop effect is likely to be missed, resulting a low hit rate of the prop. In addition, the prop needs to be switched during use of the virtual throwing prop. However, during battling against another player, an excessively slow switching speed is likely to affect the battle. As a result, the player is more inclined to attack by using another virtual prop, causing low utilization of the virtual throwing prop.

To improve the hit rate and the utilization of the virtual throwing prop during the battling, in this embodiment of this application, a triggering method of the virtual throwing prop is changed, so that after controlling the virtual object to throw a virtual prop, the player can actively select a timing for triggering the virtual throwing prop. During the battle, the player may control the virtual object to throw the virtual throwing prop to a target location in advance. In this case, the player may trigger the prop effect of the virtual throwing prop without switching the prop, thereby improving the utilization of the virtual throwing prop. In addition, compared with the method in the related art which requires passive waiting for release of the prop effect of the virtual throwing prop, actively triggering the virtual throwing prop can improve a degree of certainty of the player on the timing of releasing the prop effect, thereby improving the hit rate of the virtual throwing prop.

Referring to FIG. 1, FIG. 1 is a schematic diagram of an implementation environment according to an embodiment of this application. The implementation environment may include: a first terminal 110, a server 120, and a second terminal 130.

An application 111 supporting a virtual environment is installed and run on the first terminal 110, and the application 111 may be a multiplayer online battle program. When the first terminal runs the application 111, a UI of the application 111 is displayed on a screen of the first terminal 110. The application 111 may be any one of a military simulation program, a MOBA game, a battle royale shooting game, and a simulation game (SLG). In this embodiment, the description is made by using an example in which the application 111 is a first-person shooting (FPS) game. The first terminal 110 is a terminal used by a first user 112. The first user 112 uses the first terminal 110 to control a first virtual object located in the virtual environment to perform activities, and the first virtual object may be referred to as a master virtual object of the first user 112. The activities of the first virtual object include, but are not limited to: at least one of adjusting body postures, crawling, walking, running, riding, flying, jumping, driving, picking, shooting, attacking, throwing, and skill releasing. Exemplarily, the first virtual object is a first virtual character such as a simulated character or an animation character.

An application 131 supporting a virtual environment is installed and run on the second terminal 130, and the application 131 may be a multiplayer online battle program. When the second terminal 130 runs the application 131, a UI of the application 131 is displayed on a screen of the second terminal 130. The client may be any one of a military simulation program, a MOBA game, an escape shooting game, and an SLG game. In this embodiment, description is made below by using an example in which the application 131 is an FPS game. The second terminal 130 is a terminal used by a second user 132. The second user 132 uses the second terminal 130 to control a second virtual object located in the virtual environment to perform activities, and the second virtual object may be referred to as a main virtual role of the second user 132. Exemplarily, the second virtual object is a second virtual character, such as a simulated person or an animation character.

In some embodiments, the first virtual object and the second virtual object are located in the same virtual world. In some embodiments, the first virtual object and the second virtual object may belong to the same camp, the same team, or the same organization, have a friend relationship with each other, or have a temporary communication permission. In some embodiments, the first virtual object and the second virtual object may belong to different camps, different teams, or different organizations, or have a hostile relationship with each other.

In some embodiments, the application installed on the first terminal 110 is same as the application installed on the second terminal 130, or the applications installed on the two terminals are applications of a same type on different operating system platforms (such as Android or IOS). The first terminal 110 may generally refer to one of a plurality of terminals, and the second terminal 130 may generally refer to another one of a plurality of terminals. In this embodiment, only the first terminal 110 and the second terminal 130 are used as an example for description. Device types of the first terminal 110 and the second terminal 130 are the same or different. The device type includes at least one of a smartphone, a tablet computer, an e-book reader, a Moving Picture Experts Group Audio Layer III (MP3) player, a Moving Picture Experts Group Audio Layer IV (MP4) player, a laptop computer, and a desktop computer.

FIG. 1 shows only two terminals. However, a plurality of other terminals may access the server 120 in different embodiments. In some embodiments, one or more terminals are terminals corresponding to a developer. A developing and editing platform for the application supporting a virtual environment is installed on the terminal. The developer may edit and update the application on the terminal and transmit an updated application installation package to the server 120 by using a wired or wireless network. The first terminal 110 and the second terminal 130 may download the application installation package from the server 120 to update the application.

The first terminal 110, the second terminal 130, and the other terminals are connected to the server 120 through a wireless or wired network.

The server 120 includes at least one of one server, a server cluster including a plurality of servers, a cloud computing platform, and a virtualization center. The server 120 is configured to provide background services for an application program supporting a three-dimensional virtual environment. In some embodiments, the server 120 is in charge of primary computing, and the terminals are in charge of secondary computing. Alternatively, the server 120 is in charge of the secondary computing, and the terminals are in charge of the primary computing. Alternatively, the server 120 and the terminal perform collaborative computing based on a distributed computing architecture.

In a schematic example, the server 120 includes a memory 121, a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is configured to store data of user accounts used by the first terminal 110, the second terminal 130, and another terminal, for example, avatars of the user accounts, nicknames of the user accounts, levels of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 by using a wireless network or a wired network for data exchange.

In addition, in the following embodiments, operations such as controlling the virtual object to switch the virtual prop, controlling the virtual object to perform a specific action (for example, a throwing action), triggering the virtual prop (for example, triggering the virtual throwing prop), and controlling the virtual object to move may be performed by the terminal, or may be performed by the server, or may be performed by the terminal and the server in a cooperation method. This is not limited in this embodiment of this application. For convenience of description, the following embodiments are exemplarily described by using an example in which the following operations are performed by the terminal.

Figure 2:
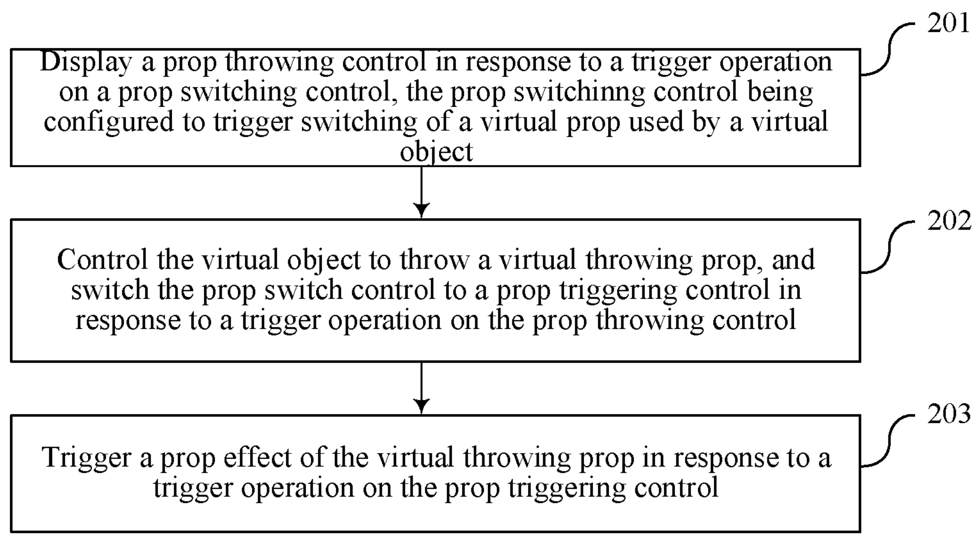
FIG. 2 is a flowchart of a method for using a virtual throwing prop according to an exemplary embodiment of this application.

Referring to FIG. 2, FIG. 2 is a flowchart of a method for using a virtual throwing prop according to an exemplary embodiment of this application. This embodiment is described by using an example in which the method is applied to a first terminal 110 or a second terminal 130 in an implementation environment shown in FIG. 1 or another terminal in the implementation environment. The method includes the following steps:

Step 201: Display a prop throwing control in response to a trigger operation on a prop switching control, the prop switching control being configured to trigger switching of a virtual prop used by a virtual object.

The method provided in this embodiment of this application is applicable to a virtual environment. The virtual environment includes a first virtual object and a second virtual object, where the first virtual object and the second virtual object belong to different camps. In one embodiment, the terminal displays the virtual environment through a virtual environment picture. In some embodiments, the virtual environment picture is a picture of observing a virtual environment from the perspective of a virtual object. The perspective is an observation angle for observation from a first-person perspective or a third-person perspective of the virtual object in the virtual environment. In some embodiments, in the embodiments of this application, the perspective is an angle for observing the virtual object by using a camera model in the virtual environment.

In some embodiments, the camera model automatically follows the virtual object in the virtual environment. That is, when a position of the virtual object in the virtual environment changes, a position of the camera model following the virtual object in the virtual environment changes simultaneously, and the camera model is always within a preset distance range from the virtual object in the virtual environment. In some embodiments, in the automatic following process, relative positions of the camera model and the virtual object remain unchanged.

The camera model is a three-dimensional model located around a virtual object in a virtual environment. When the first-person perspective is used, the camera model is located nearby the head of the virtual object or at the head of the virtual object. When the third-person perspective is used, the camera model may be located behind the virtual object and bound to the virtual object, or may be located at any position away from the virtual object by a preset distance. The virtual object located in the virtual environment may be observed from different angles through the camera model. In some embodiments, when the third-person perspective is a first-person over-shoulder perspective, the camera model is located behind the virtual object (for example, the head and shoulders of the virtual character). In some embodiments, in addition to the first-person perspective and the third-person perspective, the perspective also includes other perspectives, such as a top perspective. When the top perspective is used, the camera model may be located above the head of the virtual object. The top perspective is a perspective for observing the virtual environment at an angle from the air. In some embodiments, the camera model is not displayed in the virtual environment. In other words, the camera model is not displayed in the virtual environment displayed in the UI.

In one embodiment, a virtual environment interface displays the prop switching control, where the prop switching control is configured to control the virtual object to switch a currently used virtual prop. Correspondingly, a prop use control in the virtual environment interface may also change accordingly when the trigger operation on the prop switching control is received, where a changed prop use control matches a switched virtual prop. For example, when the trigger operation on the prop switching control is received, the terminal switches a shooting control (which is a virtual gun currently used by the virtual object) configured to control the virtual object to perform shooting to the prop throwing control configured to control the virtual object to perform throwing (that is, the virtual object switches the virtual throwing prop). In another example, when the trigger operation on the prop switching control is received, the terminal switches the prop throwing control back to the shooting control configured to control the virtual object to perform shooting. In this embodiment of this application, when the terminal receives the trigger operation on the prop switching control, the virtual prop used by the virtual object is switched to the virtual throwing prop, and the prop throwing control corresponding to the virtual throwing prop is displayed.

In some embodiments, in this embodiment of this application, the trigger operation may be at least one of a single-click/tap operation, a double-click/tap operation, a long press operation, a drag operation, or a slide operation. A specific trigger operation is not limited in this embodiment of this application.

Figure 3:
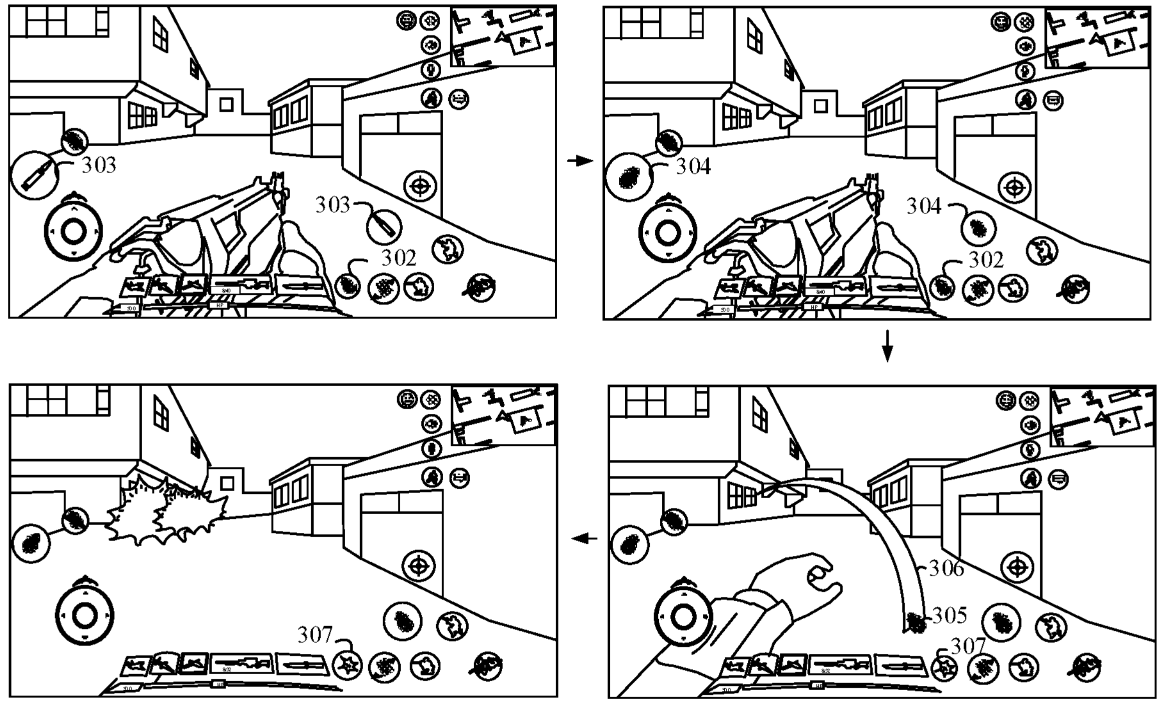
FIG. 3 is a schematic diagram of a process of triggering a virtual throwing prop according to an exemplary embodiment of this application.

For example, as shown in FIG. 3, the virtual environment interface displays a prop switching control 302, and the virtual object is performing a shooting action. When the player clicks/taps the prop switching control 302, the terminal may switch a shooting control 303 displayed in the virtual environment interface to a prop throwing control 304.

In this embodiment of this application, the virtual throwing prop is a virtual throwing prop having an active triggering function. In one embodiment, the player may be equipped with the virtual throwing prop having the active triggering function before a battle, that is, a virtual prop equipment interface is first displayed before the virtual environment interface is displayed, where in the virtual prop equipment interface, the player may select the virtual throwing prop having the active triggering function, for example, an actively-trigger grenade, smoke grenade, and flash bomb.

In another embodiment, the virtual throwing prop having the active triggering function may be picked up from the virtual environment after a battle is entered. The virtual throwing prop in the virtual environment may be dropped by the virtual object, or may be generated at a fixed location. This is not limited in this embodiment.

Step 202: Control, in response to a trigger operation on the prop throwing control, the virtual object to throw a virtual throwing prop, and switch the prop switching control to a prop triggering control.

In one embodiment, when receiving the trigger operation on the prop throwing control, the terminal controls the virtual object to throw the virtual throwing prop. During throwing, a throw route of the virtual throwing prop is displayed in the virtual environment interface. The player may perform different trigger operations on the prop throwing control, so that the throw route of the virtual throwing prop changes, and the virtual throwing prop is thrown at a target location in the virtual environment.

In some embodiments, the throw route may be determined according to an initial speed and a throw direction of the virtual throwing prop, and acceleration of gravity. When controlling the virtual object to throw the virtual throwing prop, the terminal obtains the initial speed and the throw direction of the virtual throwing prop, then determines a ray trajectory of the virtual throwing prop based on the acceleration of gravity, takes n points at intervals of a fixed distance to form the ray trajectory, and displays the trajectory in a virtual environment picture.

To change the triggering method of the virtual throwing prop, the prop triggering control is introduced in this embodiment of this application. In addition, to avoid adding an additional control, resulting in that the virtual environment picture is further blocked, and difficulty of an operation performed by the user is increased, in one embodiment, when receiving the trigger operation on the prop throwing control, the terminal switches the prop switching control to the prop triggering control, that is, the prop triggering control reuses the prop switching control previously displayed, and there is no need to add an additional control. In some embodiments, the terminal may be switched after the virtual throwing prop is thrown and before the virtual throwing prop is fallen to the ground, or may be switched after the virtual throwing prop is fallen to the ground. The timing of switching a control is not defined in this embodiment of this application. Furthermore, to avoid displaying too many controls, in this embodiment of this application, only the prop switching control is switched to the prop triggering control, and no additional control is added, so as to avoid excessively blocking the picture.

In this embodiment of this application, the terminal may switch the prop switching control to the prop triggering control only after the virtual throwing prop having the active triggering function is thrown, and the prop switching control may not be switched after other virtual throwing props are thrown.

In some embodiments, the prop triggering control may be displayed in a form of a pattern such as a button or a prop explosion model; or may be displayed in a form of text, for example, "trigger"; or the prop triggering control may be displayed in a form of a control icon. A display form of the prop triggering control is not limited in this embodiment of this application.

For example, as shown in FIG. 3, after the player clicks the prop throwing control 304, the terminal controls the virtual object to throw a grenade 305, and displays a throw route 306. The prop switching control 302 is switched to a prop triggering control 307 after the grenade 305 is thrown out.

In addition to controlling, by the terminal, the virtual object to throw the virtual throwing prop, in another embodiment, the controlling the virtual object to throw the virtual throwing prop may alternatively be performed by the server, that is, the server determines a throw route according to a position of the virtual object, an initial speed and a throw direction of the virtual throwing prop, and acceleration of gravity, to control the virtual object to throw the virtual throwing prop in the throw route, and the terminal displays a picture in which the virtual object throws the virtual throwing prop.

In other embodiments, the controlling the virtual object to throw the virtual throwing prop may also be interactively performed by the server and the terminal in a cooperation method. For example, the server determines the throw route according to the position of the virtual object, the initial speed and the throw direction of the virtual throwing prop, and the acceleration of gravity, and sends the throw route to the terminal. The terminal controls the virtual object to throw the virtual throwing prop in the throw route, and displays such a picture.

Step 203: Trigger a prop effect of the virtual throwing prop in response to a trigger operation on the prop triggering control.

In one embodiment, the terminal triggers the prop effect of the virtual throwing prop when receiving the trigger operation on the prop triggering control, that is, the player may trigger the prop effect of the virtual throwing prop by performing the trigger operation on the prop throwing control, and there is no need to passively wait for the virtual throwing prop to be triggered.

In some embodiments, to simulate a picture in which an object controls a throwing item such as a bomb to take effects in practice, after the player triggers the prop throwing control, a trigger animation is presented through the virtual object, for example, the virtual object takes out a trigger apparatus (such as a remote control, a mobile phone, and the like) and performs an operation on the trigger apparatus, and after the operation is completed, the prop effect of the virtual throwing prop is displayed in the virtual environment picture.

In some embodiments, different virtual throwing props have different prop effects. Schematically, the prop effect is explosion when the virtual throwing prop is a grenade, which may reduce hit points of other virtual objects; the prop effect is releasing smoke when the virtual throwing prop is a smoke grenade, which may block partial field of view of other virtual objects; and the prop effect is a strong light when the virtual throwing prop is a flash bomb, which may transiently blind other virtual objects.

For example, as shown in FIG. 3, the grenade 305 explodes after the player clicks the prop triggering control 307, which may reduce hit points of other virtual objects within an action range.

In some embodiments, after triggering the prop effect of the virtual throwing prop, the terminal switches the prop triggering control back to the prop switching control, so that the player may continue to switch, by using the prop switching control, to using other virtual props.

In one embodiment, an automatic triggering duration is set for the virtual throwing prop, and the terminal displays the prop triggering control within the automatic triggering duration. When the trigger operation on the prop triggering control is not received within the automatic triggering duration, the terminal automatically controls the virtual prop to trigger the prop effect, and switches the prop triggering control to the prop switching control.

In addition to triggering the prop effect of the virtual throwing prop by the terminal, in another embodiment, the triggering the prop effect of the virtual throwing prop may also be performed by the server, that is, the server controls the triggering of the virtual throwing prop based on a type, a position, and an action range of the virtual throwing prop, and a position of the virtual object, and the terminal represents a trigger result.

In other embodiments, the triggering the prop effect of the virtual throwing prop may also be performed by the interactively performed by the server and the terminal in a cooperation method. For example, the server sends parameters such as the action range and an effect type of the virtual throwing prop to the terminal, and the terminal triggers the virtual throwing prop based on the parameters and represents a trigger effect.

In the embodiments of this application, after controlling a virtual object to throw a virtual throwing prop, the terminal switches a prop switching control (configured to switch a virtual prop) to a prop triggering control, and performs a trigger operation on the prop triggering control, to trigger a prop effect of the virtual throwing prop. Therefore, the triggering method of the virtual throwing prop is changed, on the one hand, a player can autonomously control to trigger the virtual throwing prop, so that the virtual throwing prop may be triggered at an appropriate time, and the hit rate of the virtual throwing prop during battling may be improved, thereby improving the utilization of the virtual throwing prop; and on the other hand, the trigger control controls release of a prop effect of a thrown prop, so that two processes of throwing a prop and releasing a prop effect are separated, thereby providing a novel human-computer interaction method, and improving richness of human-computer interaction.

In a possible scene, the virtual throwing prop has adhesiveness, and the virtual throwing prop is continuously adhered to an attachment after being thrown. Furthermore, to prevent the virtual throwing prop from being thrown to a farther position (that is, outside a field of view of the player) and making the player unable to observe a surrounding situation of the virtual throwing prop and select a trigger timing, in this embodiment of this application, specific position information and an action range of the virtual throwing prop may be displayed in a map presentation control, so that the player may learn about the surrounding situation of the virtual throwing prop more intuitively, thereby selecting an appropriate trigger timing.

Figure 4:
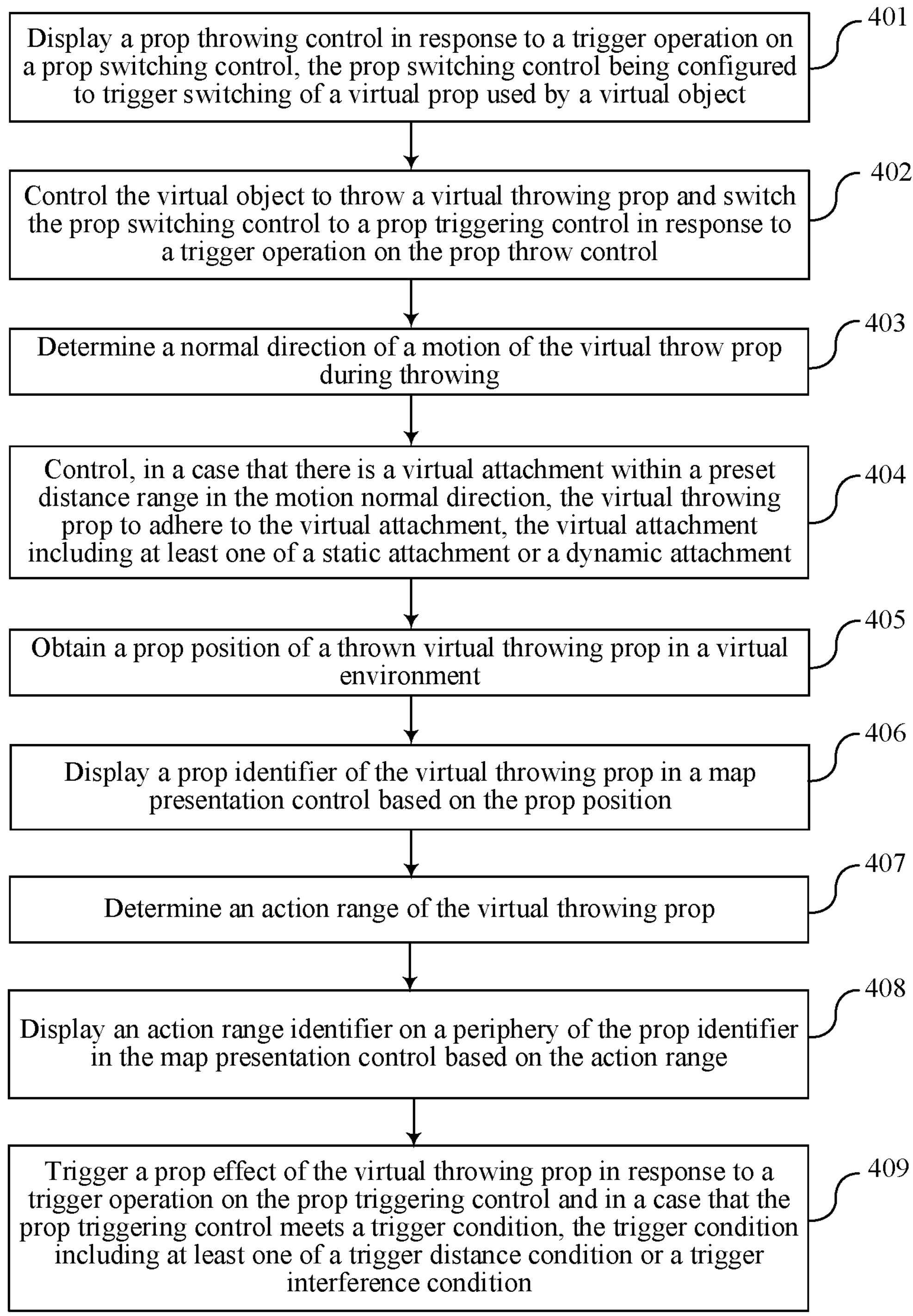
FIG. 4 is a flowchart of a method for using a virtual throwing prop according to another exemplary embodiment of this application.

Referring to FIG. 4, FIG. 4 is a flowchart of a method for using a virtual throwing prop according to another exemplary embodiment of this application. This embodiment is described by using an example in which the method is applied to a first terminal 110 or a second terminal 130 in an implementation environment shown in FIG. 1 or another terminal in the implementation environment. The method includes the following steps:

Step 401: Display a prop throwing control in response to a trigger operation on a prop switching control, the prop switching control being configured to trigger switching of a virtual prop used by a virtual object.

Step 402: Control, in response to a trigger operation on the prop throwing control, the virtual object to throw a virtual throwing prop, and switch the prop switching control to a prop triggering control.

For implementations of steps 401 and 402, reference may be made to steps 201 and 202, and details are not described again in this embodiment.

Step 403: Determine a normal direction of a motion of the virtual throwing prop during throwing.

To determine an attachment position of the virtual throwing prop, in one embodiment, when the virtual throwing prop is in a flight state, the terminal performs ray detection within a preset distance in a direction of the ray trajectory of the virtual throwing prop, and determines a virtual attachment (which may be another virtual object in the virtual environment, or may be a virtual building, a virtual vehicle, a virtual bunker, or the like in the virtual environment) in the direction of the ray trajectory, for example, the preset distance may be 50 cm. To determine a specific position of the virtual attachment, a normal direction of the virtual object further needs to be determined, so that the specific position of the virtual attachment may be determined, and the terminal controls the virtual throwing prop to adhere to the virtual attachment.

Step 404: Control, when there is a virtual attachment within a preset distance range in the normal direction of a motion, the virtual throwing prop to adhere to the virtual attachment, the virtual attachment including at least one of a static attachment or a dynamic attachment.

In some embodiments, the virtual throwing prop in this embodiment of this application may have adhesiveness, when detecting that there is a virtual attachment within a preset distance in the normal direction of a motion of the virtual throwing prop, the terminal may control the virtual throwing prop to continuously adhere to the virtual attachment.

In some embodiments, the virtual attachment may be at least one of the static attachment or the dynamic attachment. The static attachment is an object that cannot move or keeps in a stationary state in the virtual environment within a period of time, for example, a wall, a stone, a table and chair, a bicycle that no one rides, a motor vehicle that no one drives, an airplane that no one flies, various plants, and the like. The dynamic attachment is an object that can move or keeps in a moving state (including a rotating state) in the virtual environment within a period of time, for example, a virtual object, a virtual object running (or a virtual object performing another action), a motor traveling, a bicycle being used by the virtual object, an airplane flying, a stone being thrown by the virtual object, an oil drum being lifted by the virtual object, and the like.

Step 405: Obtain a prop position of a thrown virtual throwing prop in the virtual environment.

To enable the player to learn about a position of a thrown virtual throwing prop more intuitively, in one embodiment, the terminal obtains a prop position of the virtual throwing prop in the virtual environment after the virtual throwing prop is thrown. In some embodiments, the prop position may be determined according to coordinates of the virtual throwing prop in the virtual environment, where the coordinates may be determined by the terminal, or may be obtained by the terminal from the server.

In some embodiments, the prop position of the virtual throwing prop in the virtual environment does not change when the virtual throwing prop is adhered to the static attachment; and the prop position of the virtual throwing prop in the virtual environment changes with a position of the dynamic attachment when the virtual throwing prop is adhered to the dynamic attachment. For example, when the virtual throwing prop is adhered to another virtual object in the virtual environment, the terminal acquires coordinate information of another virtual object in real time, thereby obtaining the prop position of the virtual throwing prop in the virtual environment.

Step 406: Display a prop identifier of the virtual throwing prop in a map presentation control based on the prop position.

Figure 5:
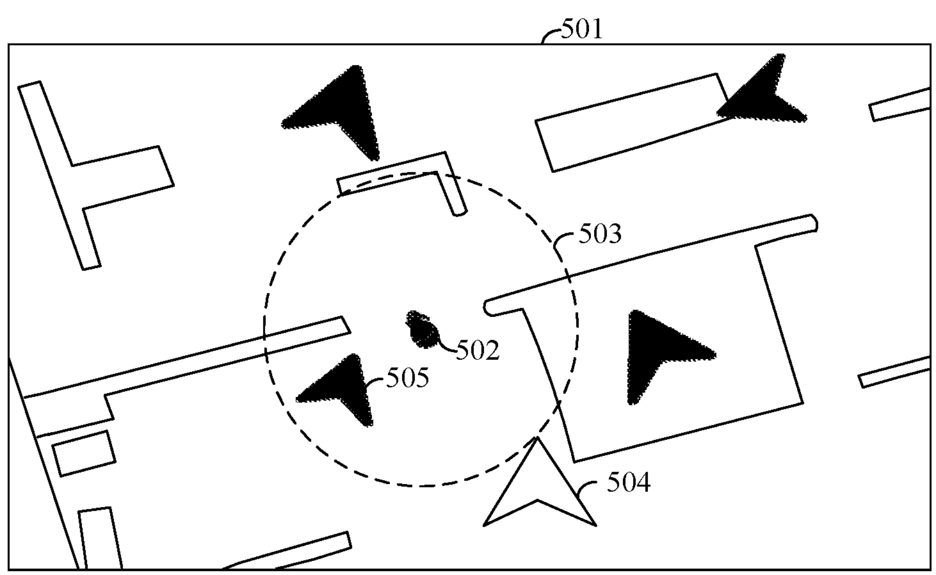
FIG. 5 is a schematic diagram of display of a prop identifier and an action range identifier of a virtual throwing prop in a map presentation control according to an exemplary embodiment of this application.

In one embodiment, the terminal displays the prop identifier of the virtual throwing prop in the map presentation control after obtaining the prop position of the virtual throwing prop in the virtual environment. The map presentation control is configured to display a local or overall virtual environment region, and display a position of the virtual object in the virtual environment. Virtual objects from different camps may be distinguished by using identifiers of different colors. For example, as shown in FIG. 5, a prop identifier 502 of the virtual throwing prop is displayed in a map presentation control 501.

In some embodiments, the prop identifier of the virtual throwing prop may be displayed in a form such as a point, a circle, or a prop model. This is not limited in this embodiment of this application.

Step 407: Determine an action range of the virtual throwing prop.

In some embodiments, the virtual throwing prop has a certain action range, which only causes damage or interference to other virtual objects within the action range, and does not affect other virtual objects outside the action range. Therefore, to enable the player to select a more appropriate trigger timing (that is, triggering the virtual throwing prop when there is a virtual object within the action range of the virtual throwing prop), in one embodiment, the action range of the virtual throwing prop further needs to be determined after the prop position of the virtual throwing prop is determined. The action range may be a range centered on the virtual throwing prop within a fixed distance, and different virtual throwing prop may correspond to different action ranges. In addition, different degrees of damage or interference at different positions within the action range may be preset.

For example, the action range may be within 10 m of the grenade when the virtual throwing prop is a grenade; and a hit point is reduced by 80 points when the virtual object is located within 3 m of the grenade, the hit point is reduced by 50 points when a distance between the virtual object and the grenade is greater than 3 m and less than 6 m, and the hit point is reduced by 20 points when the distance between the virtual object and the grenade is greater than 6 m and less than 10 m.

Step 408: Display an action range identifier on a periphery of the prop identifier in the map presentation control based on the action range.

In one embodiment, the terminal displays the action range identifier in the map presentation control according to the obtained action range of the virtual throwing prop.

For example, as shown in FIG. 5, an action range identifier 503 is displayed on the periphery of the prop identifier 502 of the virtual throwing prop. An identifier 504 of a virtual object controlled by the player and identifiers 505 of virtual objects from different camps are further displayed in the map presentation control. The identifiers 505 of the virtual objects indicate that the virtual objects are currently within the action range of the virtual throwing prop, and in this case, the player may cause damage or interference to the virtual object by triggering the prop effect of the virtual throwing prop.

After obtaining the prop position, the terminal may determine the action range and then simultaneously display the prop identifier and the action range, that is, step 406 and step 408 may be simultaneously performed. This is not limited in this embodiment.

Step 409: Trigger the prop effect of the virtual throwing prop in response to the trigger operation on the prop triggering control and when the prop triggering control meets a trigger condition, the trigger condition including at least one of a trigger distance condition or a trigger interference condition.

In this embodiment of this application, a trigger condition is further introduced to simulate a control effect on the virtual prop more realistically. In different cases, the virtual object may be unable to trigger the virtual throwing prop.

In some embodiments, the trigger condition may include at least one of the trigger distance condition or the trigger interference condition. A process of triggering the virtual throwing prop in different trigger conditions is exemplarily described below.

Figure 6:
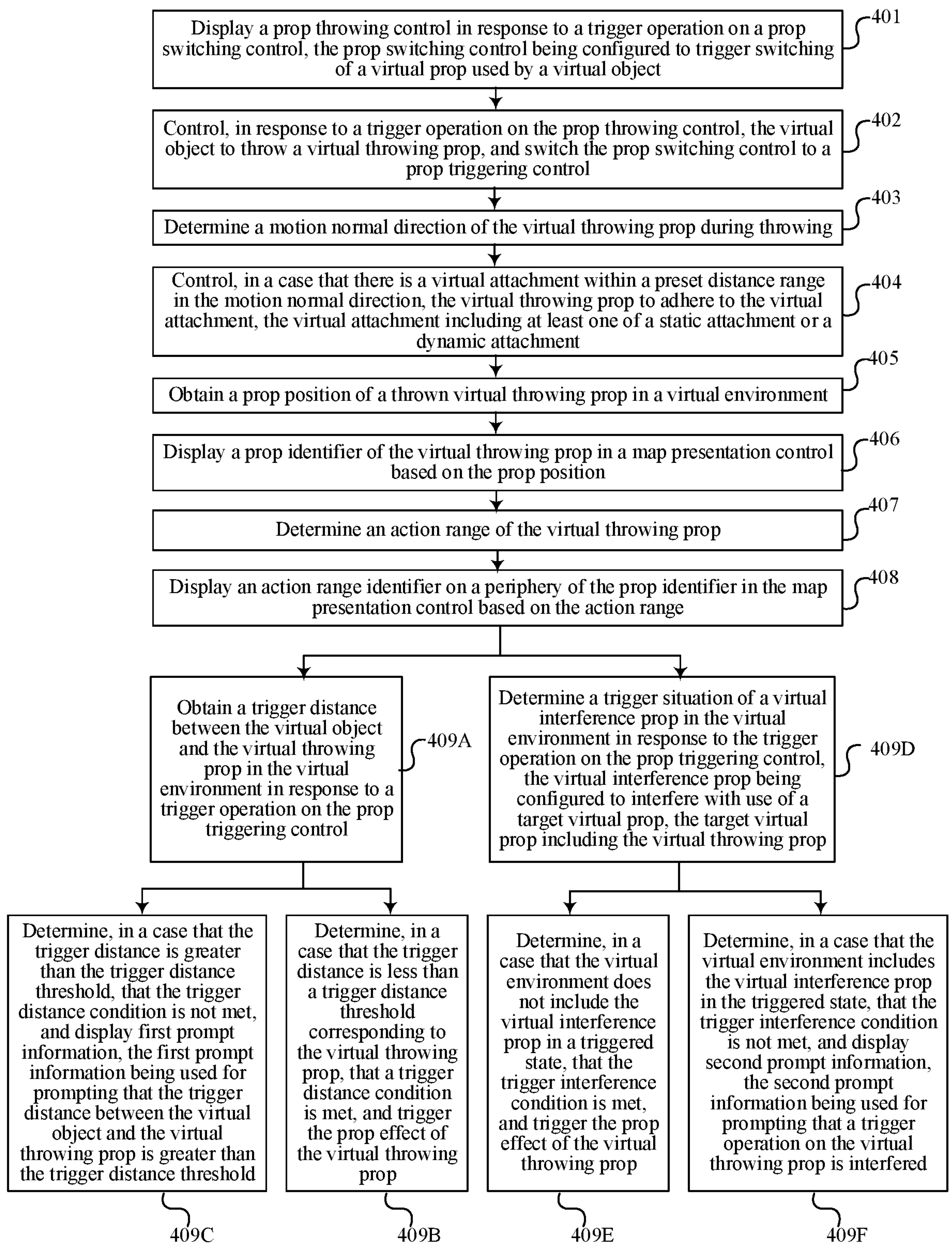
FIG. 6 is a flowchart of a method for using a virtual throwing prop according to another exemplary embodiment of this application.

Referring to FIG. 6, step 409 may be replaced by the following steps:

Step 409A: Obtain a trigger distance between the virtual object and the virtual throwing prop in a virtual environment in response to the trigger operation on the prop triggering control.

In some embodiments, when the trigger condition is a trigger distance, the terminal obtains the trigger distance between the virtual object and the virtual throwing prop in the virtual environment after the virtual throwing prop is thrown, where the trigger distance may be determined according to coordinates of the virtual object and the virtual throwing prop, and the trigger distance may be a linear distance between the virtual object and the virtual throwing prop.

Step 409B: Determine, when the trigger distance is less than a trigger distance threshold corresponding to the virtual throwing prop, that the trigger distance condition is met, and trigger the prop effect of the virtual throwing prop.

To more realistically simulate that the virtual throwing prop can only be triggered with a specific distance, in one embodiment, the terminal detects whether the trigger distance is less than the trigger distance threshold corresponding to the virtual throwing prop, and determines, when the trigger distance is less than the trigger distance threshold, that the trigger distance condition is met, so that the prop effect of the virtual throwing prop may be triggered.

In some embodiments, the trigger distance threshold may be determined according to a prop type, and different prop types correspond to different trigger distance thresholds. For example, a trigger distance threshold of a damage-type virtual throwing prop such as a grenade may be 100 m, and a trigger distance threshold of an interference-type virtual throwing prop such as a smoke grenade may be 50 m.

Figure 7:
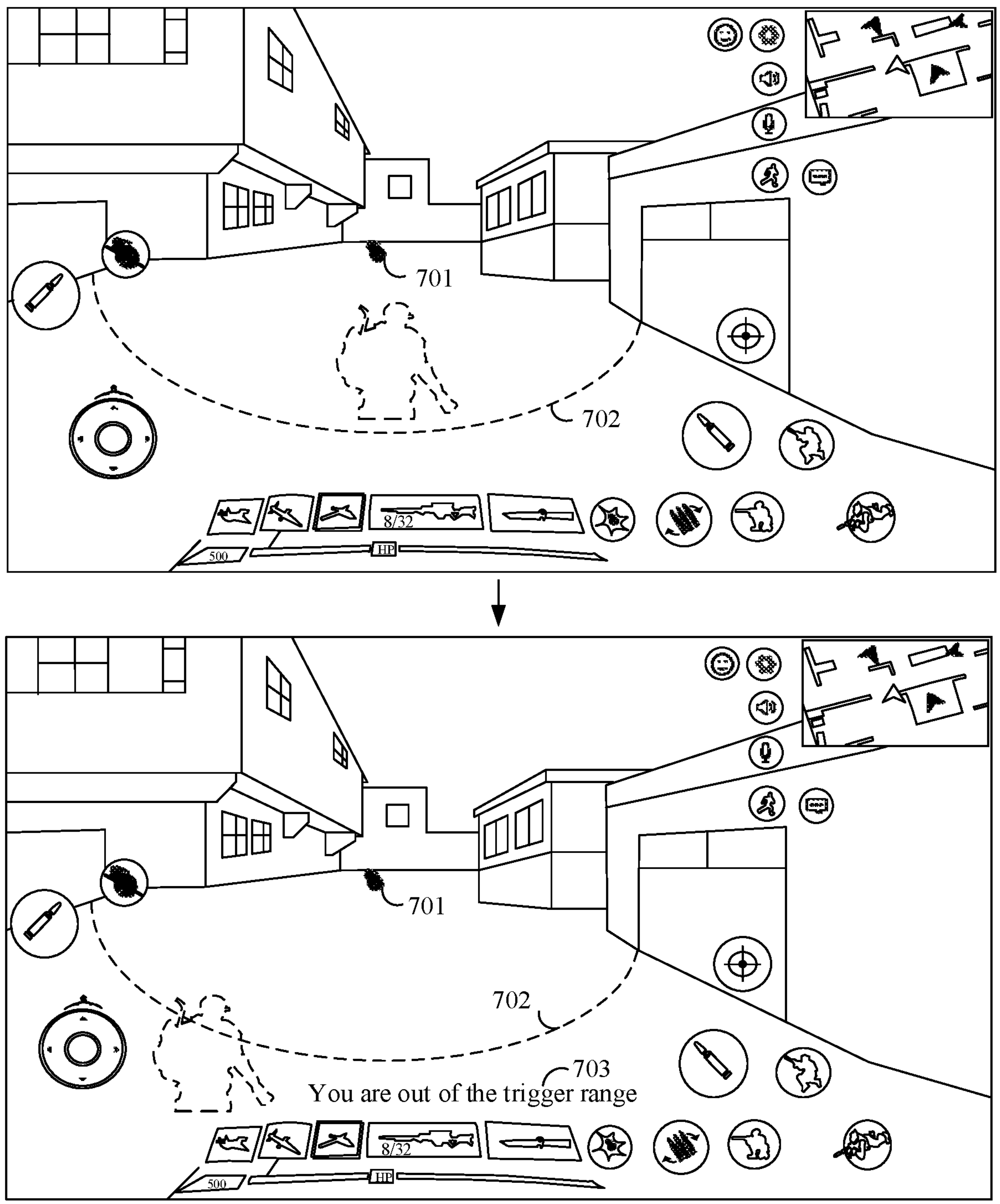
FIG. 7 is a schematic diagram of a use situation of a virtual throwing prop in which a virtual object is at different trigger distances according to an exemplary embodiment of this application.

For example, as shown in FIG. 7, the virtual object is located with a trigger distance threshold 702 of a grenade 701. In this case, the player triggers the prop triggering control to control the grenade 701 to explode.

Step 409C: Determine, when the trigger distance is greater than the trigger distance threshold, that the trigger distance condition is not met, and display first prompt information, the first prompt information being used for prompting that the trigger distance between the virtual object and the virtual throwing prop is greater than the trigger distance threshold.

In one embodiment, when the obtained trigger distance is greater than the trigger distance threshold corresponding to the virtual throwing prop, it indicates that the virtual object is located outside a trigger range of the virtual throwing prop, and the trigger distance condition is not met, and the virtual environment interface displays the first prompt information when the player triggers the prop triggering control. In this case, the player cannot trigger the prop effect of the virtual throwing prop.

In some embodiments, the first prompt information may be displayed in the virtual environment interface in a form of text, for example, "You are out of the trigger range", to remind the user that the trigger distance between the virtual object and the virtual throwing prop is greater than the trigger distance threshold, or the first prompt information may also be displayed in a form of a warning icon. In some embodiments, the first prompt information may disappear after a fixed duration, for example, 5s. Alternatively, the first prompt information may be continuously displayed in the virtual environment interface until the trigger distance between the virtual object and the virtual throwing prop is less than the trigger distance threshold.

In some embodiments, the first prompt information may be displayed at a position such as top middle, bottom middle, or right bottom of the virtual environment interface, or the first prompt information may be displayed in the map presentation control. This is not limited in this embodiment.

In some embodiments, when the trigger distance is greater than the trigger distance threshold, the terminal displays the trigger range of the virtual throwing prop in the map presentation control, so that the player moves into the trigger range based on a displayed trigger range, to trigger the virtual throwing prop.

In one embodiment, the player may control movement of the virtual object when receiving the first prompt information, and the player mat trigger the prop effect of the virtual throwing prop when the trigger distance between the virtual object and the virtual throwing prop is less than the trigger distance threshold.

For example, as shown in FIG. 7, the virtual object is located outside of the trigger distance threshold 702. In this case, the virtual environment interface may display first prompt information 703 when the player triggers the prop triggering control, where the first prompt information 703 is represented in a form of text.

In another embodiment, the terminal detects the trigger distance between the virtual object and the virtual throwing prop in real time. When the trigger distance is less than the trigger distance threshold, the prop triggering control is normally displayed; and when the trigger distance is greater than the trigger distance threshold, the prop triggering control is abnormally displayed, for example, the prop triggering control is dimmed, or the prop triggering control is in a non-triggerable state.

Step 409D: Determine a trigger situation of a virtual interference prop in a virtual environment in response to the trigger operation on the prop triggering control, the virtual interference prop being configured to interfere with use of a target virtual prop, the target virtual prop including the virtual throwing prop.

In some embodiments, the trigger condition further includes the trigger interference condition. In one embodiment, other players may interfere with the triggering of the virtual throwing prop by using the virtual interference prop, for example, interfering with the triggering of the virtual throwing prop by using an electromagnetic pulse (EMP) grenade. Therefore, the terminal needs to determine the trigger situation of the virtual interference prop in the virtual environment.

In some embodiments, the virtual interference prop is configured to interfere with a virtual prop (that is, a target virtual prop) of a specified type, and different virtual interference props are configured to interfere with virtual props of different types. Therefore, the terminal may obtain the trigger situation of the virtual interference prop that interferes with the target virtual prop.

Step 409E: Determine, when the virtual environment does not include the virtual interference prop in a triggered state, that the trigger interference condition is met, and trigger the prop effect of the virtual throwing prop.

In one embodiment, when detecting that there is no virtual interference prop in the triggered state in the virtual environment, the terminal determines that the trigger interference condition is met, so that the prop effect of the virtual throwing prop may be triggered. The terminal may obtain a trigger status of the virtual interference prop in the virtual environment by sending a query request to the server. Alternatively, when the virtual interference prop is triggered, the server sends an interference prop trigger notification to each terminal, and then the terminal may determine, according to a reception situation of the interference prop trigger notification, whether there is a virtual interference prop in the triggered state. This is not limited in this embodiment.

Step 409F: Determine, when the virtual environment includes the virtual interference prop in the triggered state, that the trigger interference condition is not met, and display second prompt information, the second prompt information being used for prompting that a trigger operation on the virtual throwing prop is interfered.

In one embodiment, when detecting that there is a virtual interference prop in the triggered state in the virtual environment, the terminal determines that the trigger interference condition is not met, and the second prompt information is displayed in the virtual environment interface, the second prompt information being used for prompting the player that the triggering of the virtual throwing prop is interfered.

In some embodiments, the second prompt information may be displayed in the virtual environment interface in a form of text, for example, "interfered and cannot be triggered", to remind the player that the triggering of the virtual throwing prop has been interfered by the virtual interference prop, or the second prompt information may also be displayed in a form of an interference pattern. In some embodiments, the second prompt information may disappear after a fixed duration, for example, 5s. Alternatively, the second prompt information may be continuously displayed in the virtual environment interface until there is no virtual interference prop in the triggered state in the virtual environment.

In one embodiment, when receiving the second prompt information, the player may damage the virtual interference prop, for example, the prop is destroyed by firing, to cause failure of the virtual interference prop, so that the prop effect of the virtual throwing prop may be triggered.

In some embodiments, the virtual interference prop may be classified into a virtual interference prop acting on an overall virtual environment and a virtual interference prop acting on a local virtual environment. Therefore, when the trigger situation of the virtual prop in the virtual environment is determined, it is necessary to determine whether the virtual object and the virtual throwing prop are located within an interference range of the virtual interference prop. It is considered that the virtual interference prop interferes with the triggering of the virtual throwing prop when at least one of the virtual object or the virtual throwing prop is located within the interference range; and it is considered that the virtual interference prop does not affect the triggering of the virtual throwing prop when the virtual object and the virtual throwing prop are both located outside the interference range.

Figure 8:
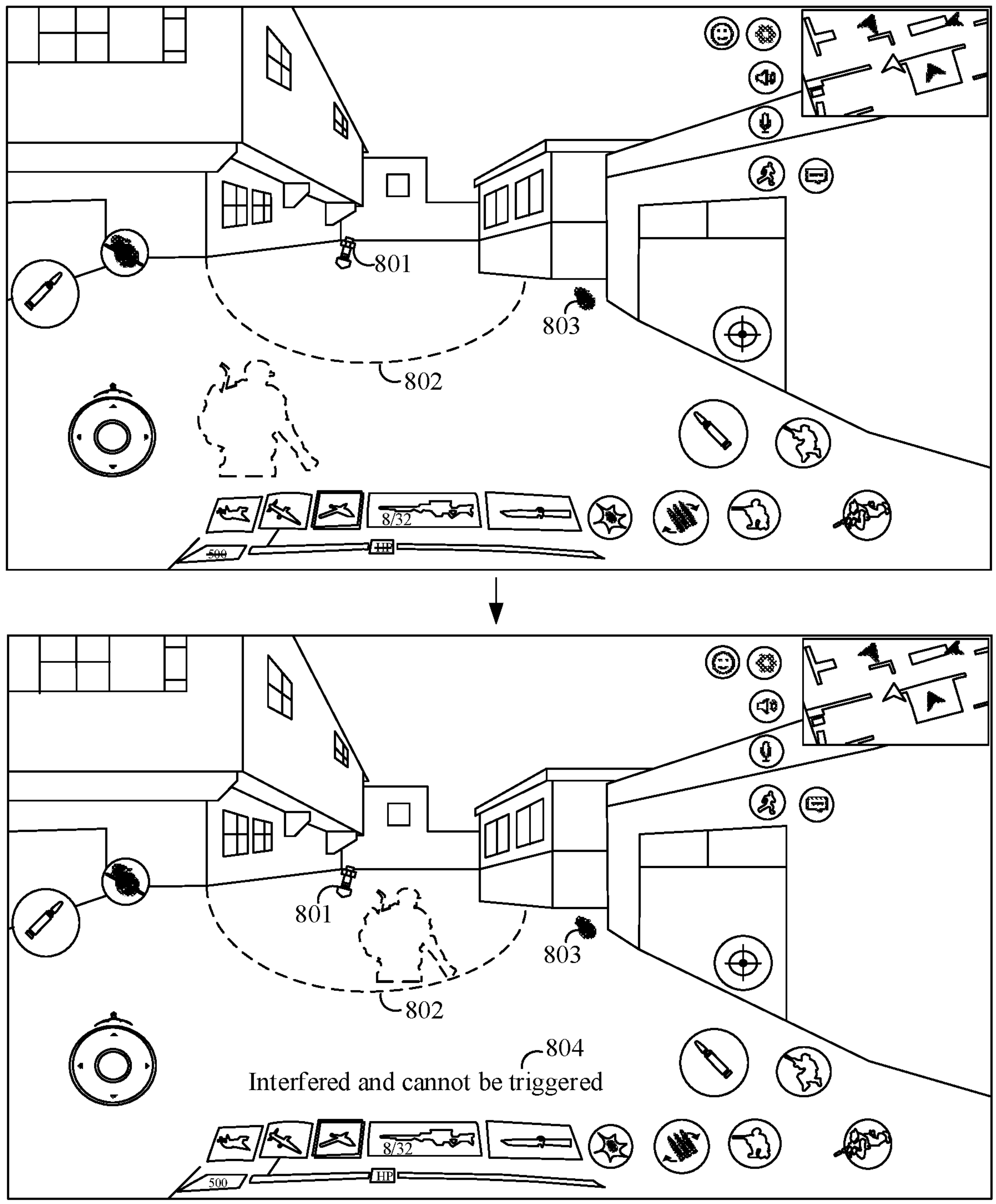
FIG. 8 is a schematic diagram of throwing interference of a virtual interference prop on a virtual throwing prop according to an exemplary embodiment of this application.

For example, as shown in FIG. 8, the virtual environment includes an EMP grenade 801 in the triggered state and a grenade 803. The EMP grenade 801 may interfere with triggering of the grenade 803, and an interference range 802 of the EMP grenade 801 is marked. The EMP grenade 801 may interfere with the triggering of the grenade 803 in case that the virtual object and the grenade are located outside the interference range 802, and in this case, the virtual object may be controlled to trigger the grenade 803. The EMP grenade 801 may interfere with the triggering of the grenade 803 when the virtual object is located within the interference range 802 of the EMP grenade 801, and the grenade 803 is located outside the interference range 802. In this case, the player triggers the prop triggering control, and the virtual environment interface may display second prompt information 804 to prompt that the grenade cannot be triggered currently.

In one embodiment, the trigger condition includes one of the trigger distance condition or the trigger interference condition. For example, the prop effect of the virtual throwing prop may be triggered when trigger interference is met within any distance range. Alternatively, when the trigger distance is met, the prop effect of the virtual throwing prop may be triggered regardless of whether there is interference caused by the virtual interference prop.

In another embodiment, the trigger condition includes the trigger distance condition and the trigger interference condition. In other words, the prop effect of the virtual throwing prop may be triggered only when the trigger distance is less than the trigger distance threshold and there is no interference caused by the virtual interference prop.

In this embodiment of this application, the prop identifier and the action range identifier of the virtual throwing prop are displayed in the map presentation control, so that the player may intuitively learn about specific position information and the action range of the virtual throwing prop in the virtual environment, the problem that the surrounding situation of the virtual throwing prop cannot be learned due to a relatively long throw distance is avoided, and a timing for triggering the virtual throwing prop may be better selected, thereby improving the hit rate.

In addition, in this embodiment of this application, the trigger condition of the virtual throwing prop is further introduced. The trigger condition includes the trigger distance condition or the trigger interference condition. The prop effect of the virtual throwing prop may be triggered when the trigger distance between the virtual throwing prop and the virtual object is less than the trigger distance threshold or the virtual throwing prop is not interfered by the virtual interference prop, thereby improving realism of the battle.

In one embodiment, the virtual environment includes virtual objects from different camps. An enemy virtual object may cause damage to the virtual throwing prop after the player controls the virtual object to throw a virtual throwing prop. In some embodiments, the enemy virtual object destroys the virtual throwing prop by shooting through a gun-type virtual weapon such as a rifle or a sniper gun, or destroy the virtual throwing prop by using a throwing virtual prop such as a grenade or a Molotov cocktail. This is not limited in this embodiment of this application.

In one embodiment, the terminal switches the prop triggering control to the prop switching control when the virtual throwing prop is damaged. In other words, the terminal switches the prop triggering control to the prop switching control when detecting that the virtual throwing prop is damaged, to remind the player that the virtual throwing prop has been damaged, thereby avoid the problem that the player cannot trigger the prop effect of the virtual throwing prop after triggering the prop triggering control, so that after switching, the player may continue to control the virtual object to throw the virtual throwing prop.

In a possible case, the virtual object carries a plurality of virtual throwing props. In this embodiment of this application, when the virtual object throws a plurality of virtual throwing props, prop effects of the plurality of virtual throwing props may also be sequentially triggered by performing a plurality of trigger operations on the prop triggering control.

Figure 9:
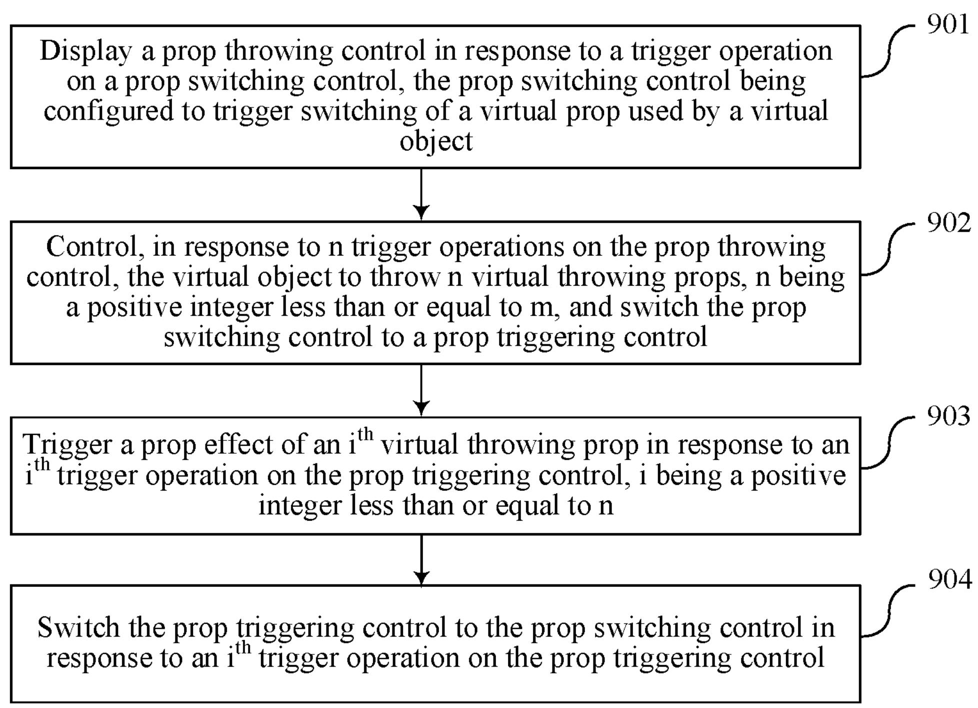
FIG. 9 is a flowchart of a method for using a virtual throwing prop according to another exemplary embodiment of this application.

Referring to FIG. 9, FIG. 9 is a flowchart of a method for using a virtual throwing prop according to another exemplary embodiment of this application. This embodiment is described by using an example in which the method is applied to a first terminal 110 or a second terminal 130 in an implementation environment shown in FIG. 1 or another terminal in the implementation environment. The method includes the following steps:

Step 901: Display a prop throwing control in response to a trigger operation on a prop switching control, the prop switching control being configured to trigger switching of a virtual prop used by a virtual object.

For the implementation of step 901, reference may be made to step 201, and details are not described again in this embodiment.

Step 902: Control, in response to n trigger operations on the prop throwing control, the virtual object to throw n virtual throwing props, n being a positive integer less than or equal to m, and switch the prop switching control to a prop triggering control.

In one embodiment, the virtual object carries a plurality of virtual throwing props. When the player triggers the prop throwing control for the first time, the terminal controls the virtual object to throw the first virtual throwing prop; when the player triggers the prop throwing control for the second time, the terminal controls the virtual object to throw the second virtual throwing prop; and when the player triggers the prop throwing control for an $n^{th}$ time, the terminal controls the virtual object to throw an $n^{th}$ virtual throwing prop. In some embodiments, n virtual throwing props may be thrown to the same position in the virtual environment, or may be thrown to different position. This is not limited in this embodiment of this application.

In some embodiments, the terminal switches the prop switching control to the prop triggering control after controlling the virtual object to throw the n virtual throwing props, and controls to trigger prop effects of the n virtual throwing props by performing the trigger operation on the prop triggering control.

In some embodiments, after controlling the virtual object to throw the n virtual throwing props, the terminal may switch the virtual throwing prop to other virtual props by using other prop switching controls. For example, it is necessary to switch back to rifle attack after the player throws a plurality of grenades, and in this case, the prop throwing control may be switched back to a shooting control by using a gun-type prop switching control.

Step 903: Trigger a prop effect of an $i^{th}$ virtual throwing prop in response to an $i^{th}$ trigger operation on the prop triggering control, i being a positive integer less than or equal to n.

In some embodiments, an order of triggering the prop effects of the virtual throwing props corresponds to an order of throwing the virtual throwing props. In one embodiment, the terminal triggers the prop effect of the first virtual throwing prop when the player triggers the prop triggering control for the first time. The first virtual throwing prop may be the first thrown virtual throwing prop, or may be the last thrown virtual throwing prop, that is, the virtual throwing prop may be controlled to release the prop effect in an order or reverse order of throwing.

In some embodiments, the prop effect of the $i^{th}$ virtual throwing prop (that is, a virtual throwing prop that is thrown for an $i^{th}$ time) is triggered when the $i^{th}$ trigger operation of the prop triggering control is received and the trigger condition is met. The trigger condition includes one of the trigger distance condition or the trigger interference condition.

For example, when the terminal controls the virtual object to throw three grenades, trigger distances between the three grenades and the virtual object are respectively obtained. A trigger distance of the first grenade is 120 m, a trigger distance of the second grenade is 80 m, and a trigger distance of the third grenade is 50 m. However, a trigger distance threshold of the grenade is 100 m. Therefore, in this case, the player can only detonate the second grenade and the third grenade, and the first grenade cannot be detonated.

In some embodiments, after the virtual object throws n virtual throwing props, the terminal may further detect whether the n virtual throwing props are damaged. The player may only trigger a prop effect of an undamaged virtual throwing prop when a damaged virtual throwing prop exists.

Step 904: Switch the prop triggering control to the prop switching control in response to an $n^{th}$ trigger operation on the prop triggering control.

In one embodiment, after the player triggers the prop triggering control for the $n^{th}$ time, the terminal controls to trigger the prop effect of the $n^{th}$ virtual throwing prop. In this case, all thrown virtual throwing props are triggered, and the prop triggering control needs to be switched to the prop switching control, so that the player may continue to control the virtual object to throw the virtual throwing prop.

In this embodiment of this application, when the virtual object controlled by the player is equipped with a plurality of virtual throwing props, the plurality of virtual throwing props may be thrown by using the prop throwing control, and prop effects of the plurality of virtual throwing props are triggered by using the prop triggering control, to increase damage or interference to other virtual objects, thereby further improving the utilization of the virtual throwing prop.

In another embodiment, the player may simultaneously trigger the prop effects of the plurality of virtual throwing props by performing a single-time trigger operation on the prop triggering control. Correspondingly, the prop effects of the n virtual throwing props are triggered in response to the trigger operation on the prop triggering control. When the n virtual throwing props are simultaneously triggered, the terminal still needs to detect a trigger condition of each virtual throwing prop. Details are not described again in this embodiment.

Figure 10:
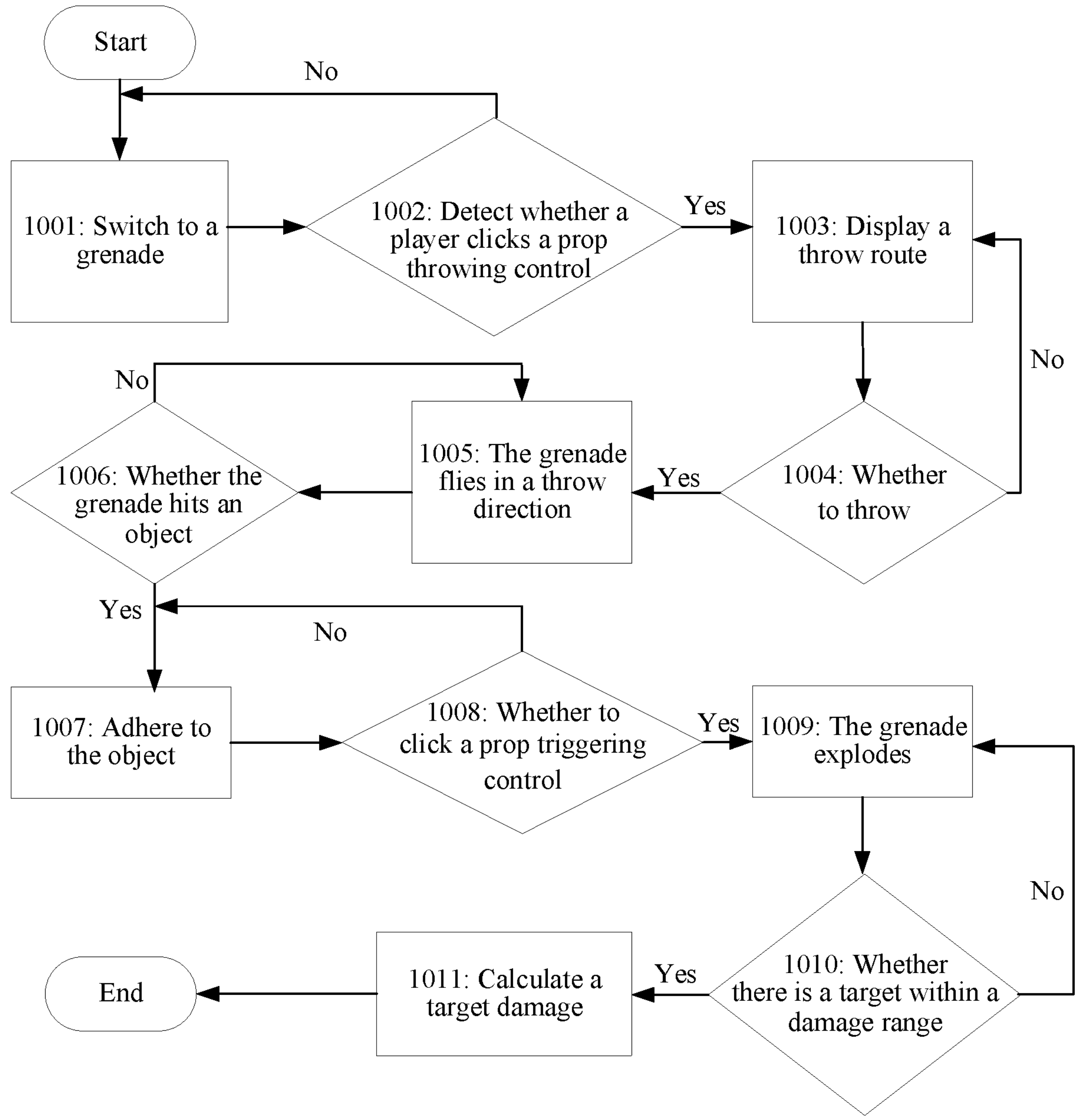
FIG. 10 is a flowchart of a method for using a virtual throwing prop according to another exemplary embodiment of this application.

With reference to the foregoing embodiments, in an exemplary example, a process of using the virtual throwing prop is shown in FIG. 10 by using an example in which the virtual throwing prop is a grenade.

Step 1001: Switch to a grenade.

Step 1002: Detect whether a player clicks a prop throwing control, if yes, perform step 1003; or otherwise, perform step 1001.

Step 1003: Display a throw route.

Step 1004: Detect whether the grenade is thrown, if yes, perform step 1005; or otherwise, perform step 1003.

Step 1005: The grenade flies in a throw direction.

Step 1006: Detect whether the grenade hits an object, if yes, perform step 1007; or otherwise, perform step 1005.

Step 1007: Adhere to the object.

Step 1008: Detect whether the player clicks a prop triggering control, if yes, perform step 1009; or otherwise, perform step 1007.

Step 1009: The grenade explodes.

Step 1010: Detect whether there is a target within a damage range, if yes, perform step 1011; or otherwise, perform step 1009.

Step 1011: Calculate a target damage.

Figure 11:
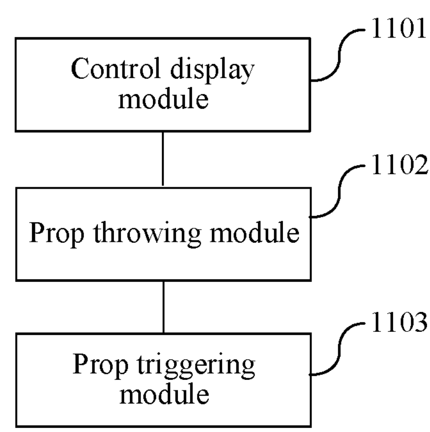
FIG. 11 is a structural block diagram of an apparatus for using a virtual throwing prop according to an exemplary embodiment of this application.

FIG. 11 is a structural block diagram of an apparatus for using a virtual throwing prop according to an exemplary embodiment of this application. The apparatus includes:

a control display module 1101, configured to display a prop throwing control in response to a trigger operation on a prop switching control, the prop switching control being configured to trigger switching of a virtual prop used by a virtual object;

a prop throwing module 1102, configured to control, in response to a trigger operation on the prop throwing control, the virtual object to throw a virtual throwing prop, and switch the prop switching control to a prop triggering control; and a prop triggering module 1103, configured to trigger a prop effect of the virtual throwing prop in response to a trigger operation on the prop triggering control.

In some embodiments, the prop triggering module 1103 is further configured to:

trigger the prop effect of the virtual throwing prop in response to the trigger operation on the prop triggering control and when the prop triggering control meets a trigger condition, the trigger condition including at least one of a trigger distance condition or a trigger interference condition.

In some embodiments, the trigger condition includes the trigger distance condition.

In some embodiments, the prop triggering module 1103 includes:

an obtaining unit, configured to obtain a trigger distance between the virtual object and the virtual throwing prop in a virtual environment in response to the trigger operation on the prop triggering control; and a trigger unit, configured to determine, when the trigger distance is less than a trigger distance threshold corresponding to the virtual throwing prop, that the trigger distance condition is met, and trigger the prop effect of the virtual throwing prop.

In some embodiments, the apparatus further includes:

a first display module, configured to determine, when the trigger distance is greater than the trigger distance threshold, that the trigger distance condition is not met, and display first prompt information, the first prompt information being used for prompting that the trigger distance between the virtual object and the virtual throwing prop is greater than the trigger distance threshold.

In some embodiments, the trigger condition includes the trigger interference condition.

In some embodiments, the prop triggering module 1103 further includes:

a first determining unit, configured to determine a trigger situation of a virtual interference prop in a virtual environment in response to the trigger operation on the prop triggering control, the virtual interference prop being configured to interfere with use of a preset virtual prop, the preset virtual prop including the virtual throwing prop; and a second determination unit, configured to determine, when the virtual environment does not include the virtual interference prop in a triggered state, that the trigger interference condition is met, and trigger the prop effect of the virtual throwing prop.

In some embodiments, the apparatus further includes:

a second display module, configured to determine, when the virtual environment includes the virtual interference prop in the triggered state, that the trigger interference condition is not met, and display second prompt information, the second prompt information being used for prompting that a trigger operation on the virtual throwing prop is interfered.

In some embodiments, the second determining unit is configured to:

determine an interference range of the virtual interference prop when the virtual environment includes the virtual interference prop in the triggered state; and determine, when at least one of the virtual object or the virtual throwing prop is located within the interference range, that the trigger interference condition is not met.

In some embodiments, the apparatus further includes:

a switching module, configured to switch the prop triggering control to the prop switching control when the virtual throwing prop is damaged.

In some embodiments, the virtual object is equipped with m virtual throwing props, m being an integer greater than or equal to 2.

The prop throwing module 1102 is further configured to:

control, in response to n trigger operations on the prop throwing control, the virtual object to throw n virtual throwing props, n being a positive integer less than or equal to m.

The prop triggering module 1103 is further configured to:

trigger a prop effect of an $i^{th}$ virtual throwing prop in response to an $i^{th}$ trigger operation on the prop triggering control, i being a positive integer less than or equal to n, the $i^{th}$ virtual throwing prop being a virtual throwing prop thrown for an $i^{th}$ time; or trigger prop effects of the n virtual throwing props in response to the trigger operation on the prop triggering control.

In some embodiments, the apparatus further includes:

a switching module, configured to switch the prop triggering control to the prop switching control in response to an $n^{th}$ trigger operation on the prop triggering control.

In some embodiments, the apparatus further includes:

an obtaining module, configured to obtain a prop position of a thrown virtual throwing prop in the virtual environment; and a third display module, configured to display a prop identifier of the virtual throwing prop in a map presentation control based on the prop position.

In some embodiments, the apparatus further includes:

a first determining module, configured to determine an action range of the virtual throwing prop; and a fourth display module, configured to display an action range identifier on a periphery of the prop identifier in the map presentation control based on the action range.

In some embodiments, the virtual prop has adhesiveness.

In some embodiments, the apparatus further includes:

a second determining module, configured to determine a normal direction of a motion of the virtual throwing prop during throwing; and a control module, configured to control, when there is a virtual attachment within a preset distance range in the normal direction of a motion, the virtual throwing prop to adhere to the virtual attachment, the virtual attachment including at least one of a static attachment or a dynamic attachment.

Based on the above, in the embodiments of this application, after controlling a virtual object to throw a virtual throwing prop, the terminal switches a prop switching control (configured to switch a virtual prop) to a prop triggering control, and performs a trigger operation on the prop triggering control, to trigger a prop effect of the virtual throwing prop. Therefore, the triggering method of the virtual throwing prop is changed, on the one hand, a player can autonomously control to trigger the virtual throwing prop, so that the virtual throwing prop may be triggered at an appropriate time, and the hit rate of the virtual throwing prop during battling may be improved, thereby improving the utilization of the virtual throwing prop; and on the other hand, the trigger control controls release of a prop effect of a thrown prop, so that two processes of throwing a prop and releasing a prop effect are separated, thereby providing a novel human-computer interaction method, and improving richness of human-computer interaction.

In this embodiment of this application, the prop identifier and the action range identifier of the virtual throwing prop are displayed in the map presentation control, so that the player may intuitively learn about specific position information and the action range of the virtual throwing prop in the virtual environment, the problem that the surrounding situation of the virtual throwing prop cannot be learned due to a relatively long throw distance is avoided, and a timing for triggering the virtual throwing prop may be better selected, thereby improving the hit rate.

In addition, in this embodiment of this application, the trigger condition of the virtual throwing prop is further introduced. The trigger condition includes the trigger distance condition or the trigger interference condition. The prop effect of the virtual throwing prop may be triggered when the trigger distance between the virtual throwing prop and the virtual object is less than the trigger distance threshold or the virtual throwing prop and the virtual object are not interfered by the virtual interference prop, thereby improving realism of the battle.

In this embodiment of this application, when the virtual object controlled by the player is equipped with a plurality of virtual throwing props, the plurality of virtual throwing props may be thrown by using the prop throwing control, and prop effects of the plurality of virtual throwing props are triggered by using the prop triggering control, to increase damage or interference to other virtual objects, thereby further improving the utilization of the virtual throwing prop.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 12:
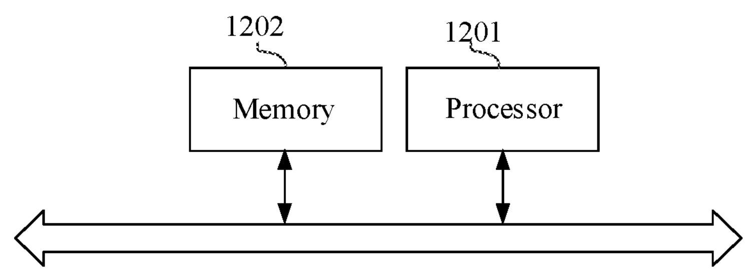
FIG. 12 is a structural block diagram of a terminal according to an exemplary embodiment of this application.

FIG. 12 is a structural block diagram of a terminal 1200 according to an exemplary embodiment of this application. The terminal 1200 may be a portable mobile terminal, for example, a smartphone, a tablet computer, a Moving Picture Experts Group Audio Layer III (MP3) player, or a Moving Picture Experts Group Audio Layer IV (MP4) player. The terminal 1200 may be further referred to as other names such as user equipment and a portable terminal.

Generally, the terminal 1200 includes a processor 1201 and a memory 1202.

The processor 1201 may include one or more processing cores, for example, a 4-core processor or an 8-core processor. The processor 1201 may be implemented by using at least one hardware form of a digital signal processor (DSP), a field-programmable gate array (FPGA), and a programmable logic array (PLA). The processor 1201 may alternatively include a main processor and a coprocessor. The main processor is a processor configured to process data in an active state, also referred to as a central processing unit (CPU). The coprocessor is a low-power processor configured to process data in a standby state. In some embodiments, the processor 1201 may be integrated with a graphics processing unit (GPU). The GPU is configured to render and draw content that needs to be displayed on a display screen. In some embodiments, the processor 1201 may further include an artificial intelligence (AI) processor. The AI processor is configured to process a computing operation related to machine learning.

The memory 1202 may include one or more computer-readable storage media. The computer-readable storage medium may be tangible and non-transient. The memory 1202 may further include a high-speed random access memory, and a non-volatile memory such as one or more magnetic disk storage devices and a flash storage device. In some embodiments, a non-transient computer-readable storage medium in the memory 1202 is configured to store at least one piece of instruction, the at least one piece of instruction being configured to be executed by the processor 1201 to implement the method provided in the embodiments of this application.

A person skilled in the art may understand that the structure shown in FIG. 12 does not constitute a limitation to the terminal 1200, and the terminal may include more or fewer components than those shown in the figure, or some components may be combined, or a different component deployment may be used.

An embodiment of this application further provides a computer-readable storage medium, storing at least one piece of instruction, the at least one piece of instruction being loaded and executed by a processor to implement the method for using a virtual throwing prop described in the foregoing embodiments.

According to an aspect of the embodiments of this application, a computer program product or a computer program is provided, the computer program product or the computer program including computer instructions, the computer instructions being stored in a computer-readable storage medium. A processor of a terminal reads the computer instructions from the computer-readable storage medium, and executes the computer instructions, to cause the terminal to perform the method for using a virtual throwing prop provided in the example implementations of the foregoing aspect.

What is claimed is:

1. A method for using a virtual throwing prop, applied to a terminal, the method comprising:

displaying a prop throwing control in response to a trigger operation on a prop switching control, the prop switching control being configured to trigger switching of a virtual prop used by a virtual object;

controlling a virtual object to throw a virtual throwing prop and switching from displaying the prop throwing control to displaying a prop triggering control in response to a trigger operation on the prop throwing control, wherein the prop triggering control is configured to trigger a prop effect of the virtual throwing prop in response to a trigger operation on the prop triggering control; and after displaying the prop triggering control, switching the prop triggering control to the prop switching control if the virtual throwing prop is damaged.

2. The method according to claim 1, wherein the triggering a prop effect of the virtual throwing prop in response to a trigger operation on the prop triggering control comprises:

triggering the prop effect of the virtual throwing prop in response to the trigger operation on the prop triggering control and when the prop triggering control meets a trigger condition, the trigger condition comprising at least one of a trigger distance condition or a trigger interference condition.

3. The method according to claim 2, wherein the trigger condition comprises the trigger distance condition; and the triggering the prop effect of the virtual throwing prop in response to the trigger operation on the prop triggering control and when the prop triggering control meets a trigger condition comprises:

obtaining a trigger distance between the virtual object and the virtual throwing prop in a virtual environment in response to the trigger operation on the prop triggering control; and determining, when the trigger distance is less than a trigger distance threshold corresponding to the virtual throwing prop, that the trigger distance condition is met, and triggering the prop effect of the virtual throwing prop; and after the obtaining a trigger distance between the virtual object and the virtual throwing prop in a virtual environment, the method further comprises:

determining, when the trigger distance is greater than the trigger distance threshold, that the trigger distance condition is not met, and displaying first prompt information, the first prompt information being used for prompting that the trigger distance between the virtual object and the virtual throwing prop is greater than the trigger distance threshold.

4. The method according to claim 2, wherein the trigger condition comprises the trigger interference condition;

the triggering the prop effect of the virtual throwing prop in response to the trigger operation on the prop triggering control and when the prop triggering control meets a trigger condition comprises:

determining a trigger situation of a virtual interference prop in a virtual environment in response to the trigger operation on the prop triggering control, the virtual interference prop being configured to interfere with use of a preset virtual prop, the preset virtual prop comprising the virtual throwing prop; and determining, when the virtual environment does not comprise the virtual interference prop in a triggered state, that the trigger interference condition is met, and triggering the prop effect of the virtual throwing prop; and after the determining a trigger situation of a virtual interference prop in a virtual environment, the method further comprises:

determining, when the virtual environment comprises the virtual interference prop in the triggered state, that the trigger interference condition is not met, and displaying second prompt information, the second prompt information being used for prompting that a trigger operation on the virtual throwing prop is interfered.

5. The method according to claim 4, wherein the determining, when the virtual environment comprises the virtual interference prop in the triggered state, that the trigger interference condition is not met comprises:

determining an interference range of the virtual interference prop if the virtual environment comprises the virtual interference prop in the triggered state; and determining, if one of the virtual object or the virtual throwing prop is located within the interference range, that the trigger interference condition is not met.

6. The method according to claim 1, wherein after the controlling a virtual object to throw a virtual throwing prop and displaying a prop triggering control in response to a trigger operation on the prop throwing control, the method further comprises:

obtaining a prop position of a thrown virtual throwing prop in the virtual environment; and displaying a prop identifier of the virtual throwing prop in a map presentation control based on the prop position.

7. The method according to claim 6, wherein after the obtaining a prop position of a thrown virtual throwing prop in the virtual environment, the method further comprises:

determining an action range of the virtual throwing prop; and displaying an action range identifier on a periphery of the prop identifier in the map presentation control based on the action range.

8. The method according to claim 1, wherein the virtual throwing prop has adhesiveness; and after the controlling a virtual object to throw a virtual throwing prop and displaying a prop triggering control in response to a trigger operation on the prop throwing control, the method further comprises:

determining a normal direction of a motion of the virtual throwing prop during throwing; and controlling, when there is a virtual attachment within a preset distance range in the normal direction of the motion, the virtual throwing prop to adhere to the virtual attachment, the virtual attachment comprising at least one of a static attachment or a dynamic attachment.

9. A terminal, comprising a processor and a memory, the memory storing at least one piece of instruction, at least one program, a code set, or an instruction set, and the at least one piece of instruction, the at least one program, the code set, or the instruction set being loaded and executed by the processor to implement the method according to claim 1.

10. A method for using a virtual throwing prop, applied to a terminal, the method comprising:

displaying a prop throwing control, wherein a virtual object is equipped with m virtual throwing props, m being an integer greater than or equal to 2;

controlling the virtual object to throw n virtual throwing prop and displaying a prop triggering control in response to n trigger operations on the prop throwing control, n being a positive integer greater than 1 and less than or equal to m; and triggering a prop effect of an $i^{th}$ virtual throwing prop in response to an $i^{th}$ trigger operation on the prop triggering control, i being a positive integer less than or equal to n, the $i^{th}$ virtual throwing prop being a virtual throwing prop thrown for an $i^{th}$ time.

11. The method according to claim 10, wherein after the triggering a prop effect of the virtual throwing prop in response to a trigger operation on the prop triggering control, the method further comprises:

switching the prop triggering control to a prop switching control in response to an $n^{th}$ trigger operation on the prop triggering control, the prop switching control being configured to trigger switching of a virtual prop used by the virtual object.

12. A terminal, comprising a processor and a memory, the memory storing at least one piece of instruction, at least one program, a code set, or an instruction set, and the at least one piece of instruction, the at least one program, the code set, or the instruction set being loaded and executed by the processor to implement the method according to claim 10.

13. A non-transitory computer-readable storage medium, storing at least one piece of instruction, at least one program, a code set, or an instruction set, the at least one piece of instruction, the at least one program, the code set, or the instruction set being loaded and executed by a processor to implement the method according to claim 10.

14. A non-transitory computer-readable storage medium, storing at least one piece of instruction, at least one program, a code set, or an instruction set, the at least one piece of instruction, the at least one program, the code set, or the instruction set being loaded and executed by a processor to implement:

displaying a prop throwing control in response to a trigger operation on a prop switching control, the prop switching control being configured to trigger switching of a virtual prop used by a virtual object;

controlling a virtual object to throw a virtual throwing prop and switching from displaying the prop throwing control to displaying a prop triggering control in response to a trigger operation on the prop throwing control, wherein the prop triggering control is configured to trigger a prop effect of the virtual throwing prop in response to a trigger operation on the prop triggering control; and after displaying the prop triggering control, switching the prop triggering control to the prop switching control if the virtual throwing prop is damaged.

15. The computer-readable storage medium according to claim 14, wherein the triggering a prop effect of the virtual throwing prop in response to a trigger operation on the prop triggering control comprises:

triggering the prop effect of the virtual throwing prop in response to the trigger operation on the prop triggering control and when the prop triggering control meets a trigger condition, the trigger condition comprising at least one of a trigger distance condition or a trigger interference condition.

16. The computer-readable storage medium according to claim 14, wherein the trigger condition comprises the trigger distance condition; and the triggering the prop effect of the virtual throwing prop in response to the trigger operation on the prop triggering control and when the prop triggering control meets a trigger condition comprises:

obtaining a trigger distance between the virtual object and the virtual throwing prop in a virtual environment in response to the trigger operation on the prop triggering control; and determining, when the trigger distance is less than a trigger distance threshold corresponding to the virtual throwing prop, that the trigger distance condition is met, and triggering the prop effect of the virtual throwing prop; and after the obtaining a trigger distance between the virtual object and the virtual throwing prop in a virtual environment, the processor is further caused to implement:

determining, when the trigger distance is greater than the trigger distance threshold, that the trigger distance condition is not met, and displaying first prompt information, the first prompt information prompting that the trigger distance between the virtual object and the virtual throwing prop is greater than the trigger distance threshold.

17. The computer-readable storage medium according to claim 14, wherein the trigger condition comprises the trigger interference condition;

the triggering the prop effect of the virtual throwing prop in response to the trigger operation on the prop triggering control and when the prop triggering control meets a trigger condition comprises:

determining a trigger situation of a virtual interference prop in a virtual environment in response to the trigger operation on the prop triggering control, the virtual interference prop being configured to interfere with use of a preset virtual prop, the preset virtual prop comprising the virtual throwing prop; and determining, when the virtual environment does not comprise the virtual interference prop in a triggered state, that the trigger interference condition is met, and triggering the prop effect of the virtual throwing prop; and after the determining a trigger situation of a virtual interference prop in a virtual environment, the processor is further caused to implement:

determining, when the virtual environment comprises the virtual interference prop in the triggered state, that the trigger interference condition is not met, and displaying second prompt information, the second prompt information for prompting that a trigger operation on the virtual throwing prop is interfered.

18. The computer-readable storage medium according to claim 17, wherein the determining, when the virtual environment comprises the virtual interference prop in the triggered state, that the trigger interference condition is not met comprises:

determining an interference range of the virtual interference prop if the virtual environment comprises the virtual interference prop in the triggered state; and determining, if one of the virtual object or the virtual throwing prop is located within the interference range, that the trigger interference condition is not met.

19. The computer-readable storage medium according to claim 14, wherein:

displaying the prop throwing control comprises: displaying the prop throwing control in response to a trigger operation on a prop switching control, the prop switching control being configured to trigger switching of a virtual prop used by a virtual object; and displaying the prop triggering control comprises: switching the prop switching control to the prop triggering control in response to the trigger operation on the prop throwing control.

* * * * *